Jan. 27, 1970          G. PASCOE          3,491,651
HEATED LOOP TYPE CUTTER AND CONTROLLED TEMPERATURE SPINDLE
Filed Oct. 3, 1967          2 Sheets-Sheet 1

INVENTOR:
GEORGE PASCOE
BY
ATTORNEYS

INVENTOR:
GEORGE PASCOE

United States Patent Office 3,491,651
Patented Jan. 27, 1970

3,491,651
HEATED LOOP TYPE CUTTER AND CONTROLLED TEMPERATURE SPINDLE
George Pascoe, Dearborn, Mich., assignor to Ford Motor Company, Dearborn, Mich., a corporation of Delaware
Filed Oct. 3, 1967, Ser. No. 672,568
Int. Cl. B26d 7/10; B26f 3/08; B23c 3/00
U.S. Cl. 90—11      2 Claims

ABSTRACT OF THE DISCLOSURE

This specification describes a cutting tool for cutting soft materials and a means for controlling the temperature of the cutting edge of the cutter so that the most efficient cutting temperature for the workpiece can be maintained.

GENERAL DESCRIPTION OF THE INVENTION

This invention comprises a controlled temperature spindle for a cutting tool that is adapted especially to be used for cutting soft material such as clay and styrene in forming models used in styling and engineering automobile bodies.

The cutting tool of my invention includes a closed loop cutting edge which is adapted to lift the material from a clay model during machining operations without an accompanying build-up in material on the tool itself. Certain forms of clay and styrene are machinable best at definite, controlled temperatures. Styrene, for example, is relatively coarse at lower temperatures, but it is highly machinable at higher temperatures. It is desirable, therefore, to raise the temperature of the cutting tool to a moderate heat level above ambient temperature during the machining by heating the cutting edge as the cutting tool passes through the material without breakage or abrasion of the finished surface. In the case of certain clays, it is desirable to lower the temperature of the cutting tool below the ambient temperature to provide a smooth, continuous and dimensionally accurate surface.

According to a principal feature of my invention, provision is made for mounting the tool in a rotary spindle which can be driven by a conventional machine. The tool itself may be heated by an induction coil powered from an extraneous source. The loop of the cutter forms a closed induction heating circuit element. The temperature is stabilized by cooling passages adapted to conduct coolant within the spindle and to extract coolant from the spindle at a controlled rate so that the temperature that is induced by the induction coil is maintained at a desired stabilized value.

In another form of my invention, an additional cooling fluid passage is provided in the spindle with the extremity thereof registering wtih the outermost edge of the cutting tool. In this instance, either air or carbon dioxide or some other suitable refrigerant may be passed through the additional cooling passage for the purpose of lowering the temperature of the cutting surfaces of the tool to a value below ambient temperature. A third cooling jet may be used either in conjunction with the other cooling passages or independently thereof, depending upon the circumstances and the temperatures that are desired.

PARTICULAR DESCRIPTION OF THE INVENTION

Figure 1:
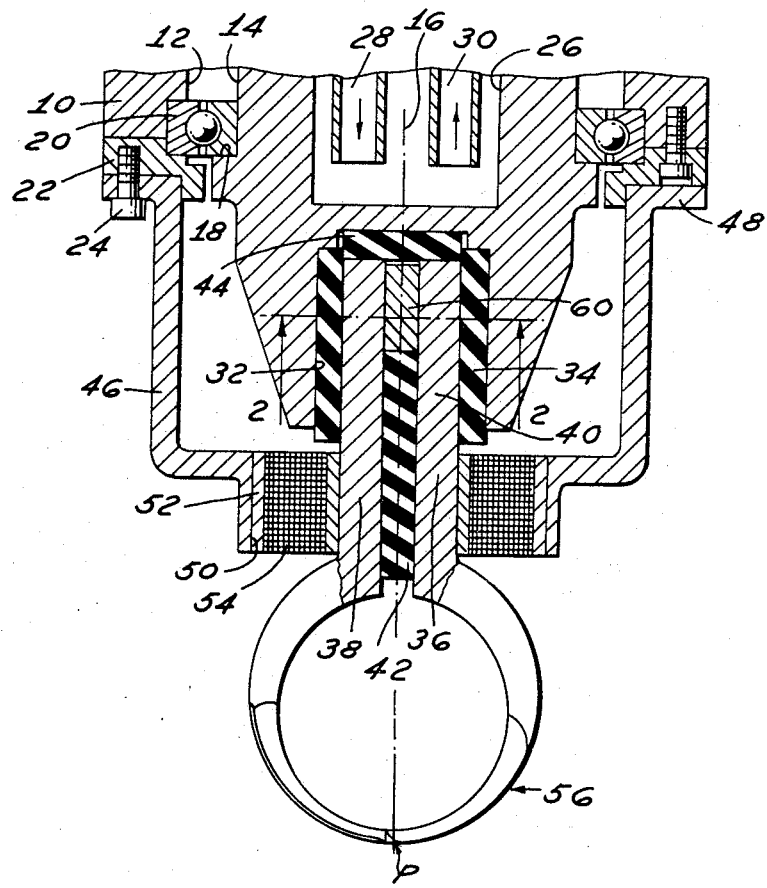
FIGURE 1 shows a cross sectional assembly view of a rotary spindle and tool assembly embodying the improvements of my invention.
Figure 2:
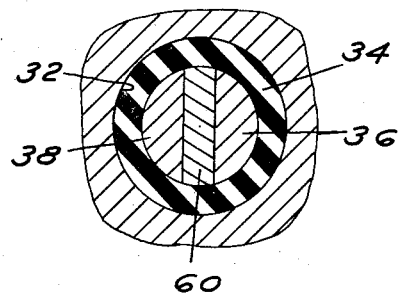
FIGURE 2 is a cross sectional view taken along the plane of section line 2—2 of FIGURE 1.

In FIGURE 1 numeral 10 designates a spindle housing which is held relatively stationary by the housing structure of a suitable machine tool. It is formed with a spindle opening 12 in which is rotatably mounted a circular spindle 14. The axis of rotation of the spindle is identified by reference character 16.

The spindle 14 is provided with a shoulder 18 which seats a bearing 20. A bearing retainer for the bearing 20 is joined to the lower end of the housing 10 as indicated by reference character 22, suitable screws or bolts 24 being provided for this purpose.

The interior of the spindle 14 is formed with a chamber 26. By preference, the chamber 26 is co-axial with respect to the axis 16 of the spindle 14. Located in the chamber 26 are coolant passages in the form of tubes 28 and 30. Tube 28 provides for an inlet flow for coolant and tube 30 provides outlet flow for the same coolant. The coolant distributed to the chamber 26 receives heat from the spindle and the heated fluid then is transferred through the outlet tube 30, which may communicate with a suitable sump or a heat exchanger as appropriate.

The lower end of the spindle 14 is provided with a socket opening 32 which receives an electrical insulator sleeve 34. Located in the sleeve 34 is a shank 36 of a cutter tool of the loop type. This tool may be similar to the one described in my co-pending application, Ser. No. 672,569, filed Oct. 3, 1967. The shank is formed with a bipartite construction. The two shank parts 38 and 40 are separated by an electrical insulator 42. The upper end of the opening 32 receives an electrical insulator washer 44 which is engaged by the ends of the shank parts 38 and 40.

Secured to the lower part of the body 10 is a spindle cap 46 which encloses the lower end of the spindle. It is provided with a flange 48 at its upper end. Flange 48 is bolted or screwed to the lower end of the housing 10. The lower end of the cap 46 is provided with an opening 50, which receives an insulated sleeve 52. Positioned within the sleeve 52 is an induction coil 54, which may be energized from an extraneous voltage source with an alternating current. The shank 36 of the tool extends through the coil as indicated. The cutting portion of the tool is generally identified by reference character 56. The cutting edges are formed on the loop portion 56 by grinding the inside diameter, one cutting edge extending from the tip point "P" in a peripheral fashion.

Figure 3:
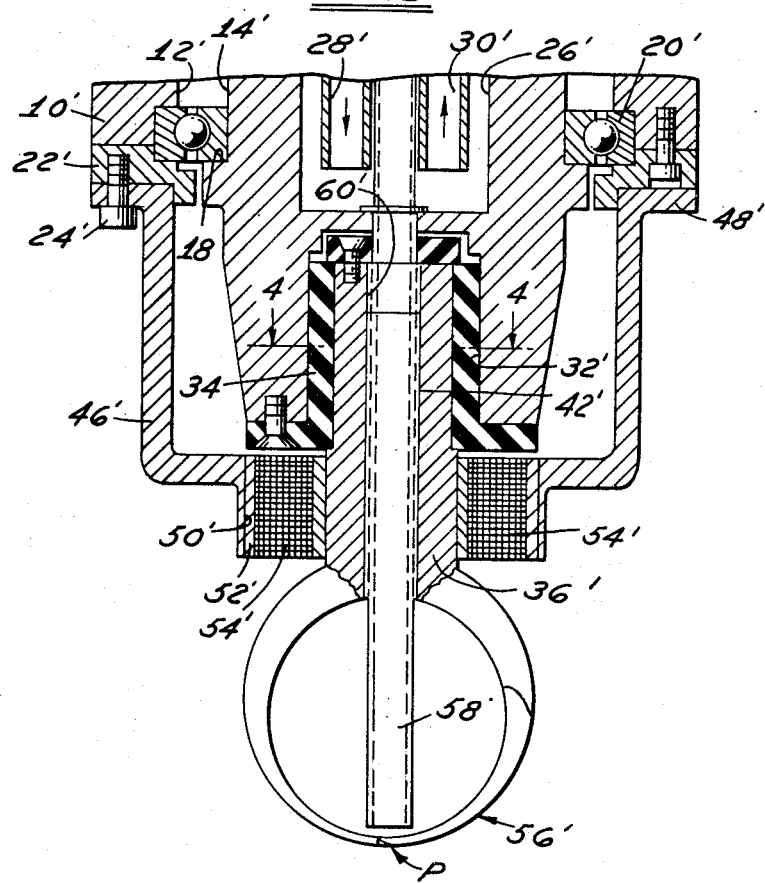
FIGURE 3 is a longitudinal cross sectional view showing a second embodiment of my invention, including a cooling passage extending to the tip of the cutting tool.
Figure 4:
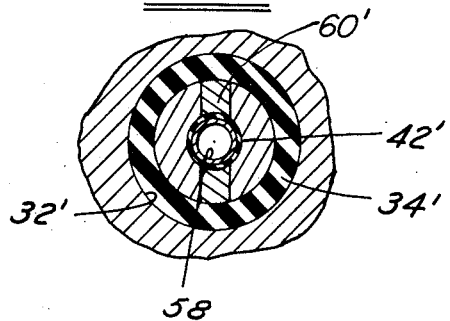
FIGURE 4 is a cross sectional view taken along the plane of section line 4—4 of FIGURE 3.

In the embodiment of FIGURE 3, all of the elements indicated in FIGURE 1 are present, and these have been identified by corresponding reference characters although prime notations have been added. In addition, however, the FIGURE 3 construction includes a fluid passage in the form of a tube 58. This extends through the shank 36 of the tube and through the center of the insulator 42'. Air or carbon dioxide or some other refrigerant gas may be passed through the tube 58 and through the center of the spindle to the tip point P of the cutter loop portion 56. In this way, the temperature of the cutting portion of the tool can be lowered to the optimum value for the particular material, such as clay, of which the model or other workpiece is formed. The cooling fluid tube 58 can be used also in conjunction with the coolant tubes 28' and 30' and the induction coil 54' to produce a heat balance. Under these circumstances, the temperature gradient that might exist along the cutting edge of the loop portion 56 can be controlled.

The mass of the metal at the extreme outer portion of the loop portion 56 is reduced relative to the portion nearest the shank. The lower end, therefore, provides the greater resistance in the induction heating circuit.

A metal bridge 60 is situated between the shank parts 38 and 40 in FIGURE 1 to complete the closed induction loop circuit. A corresponding metal insert or bridge is provided at the 60' in the FIGURE 3 construction.

Having described preferred forms of my invention, what I claim and desire to secure by U.S. Letters Patent is:

1. A heated cutter and spindle assembly comprising a cutter element having a shank, cutter portions formed on said shank and defining a closed loop, cutting edges formed on said loop portions, a spindle, a relatively stationary spindle housing, means for journalling rotatably said spindle in said housing for rotation about an axis, said loop portion being situated externally of said spindle, an induction coil surrounding said shank, means for mounting said induction coil on said spindle housing, said shank being formed in two parts, means for insulating one part with respect to the other, an electrically conductive bridge connecting said shank parts to form a closed induction loop circuit, a coolant recess formed in said spindle, and coolant passages communicating with said recess for conducting coolant into and out of said recess whereby the temperature of said spindle can be controlled.

2. A heated cutter and spindle assembly comprising a cutter element having a shank, cutter portions formed on said shank and defining a closed loop, cutting edges formed on said loop portions, a spindle, a relatively stationary spindle housing, means for journalling rotatably said spindle in said housing for rotation about an axis, an opening in said spindle, means for securing said shank within said opening with the axis thereof coinciding with the axis of rotation of said spindle, said loop portion being situated externally of said spindle, an induction coil surrounding said shank, means for mounting said induction coil on said spindle housing, said shank being formed in two parts, means for insulating one part with respect to the other, an electrically conductive bridge connecting said shank parts to form a closed induction loop circuit, a coolant recess formed in said spindle, and coolant passages communicating with said recess for conducting coolant into and out of said recess whereby the temperature of said spindle can be controlled, and an additional fluid passage extending through said spindle and through said shank, said additional passage terminating adjacent the outermost extremity of said loop portion whereby coolant may be transmitted to the region of the cutting edges of said loop portions.

References Cited

UNITED STATES PATENTS

| | | | |
|---|---|---|---|
| Re. 26,276 | 10/1967 | Hirschhorn | 83—171 |
| 2,124,831 | 7/1938 | Roos | 77—55 |
| 2,464,718 | 3/1949 | Potter et al. | 83—171 |
| 2,600,453 | 6/1952 | Weingart | 29—106 |
| 2,690,147 | 9/1954 | Adams | 77—55 |
| 2,777,702 | 1/1957 | Rodal | 77—55 |

GERALD A. DOST, Primary Examiner

U.S. Cl. X.R.

29—106; 83—5, 171